(12) United States Patent
Sharivker et al.

(10) Patent No.: US 11,865,629 B2
(45) Date of Patent: Jan. 9, 2024

(54) ROTARY CUTTING TOOL WITH HIGH RAMP ANGLE CAPABILITY

(71) Applicant: Kennametal Inc., Latrobe, PA (US)

(72) Inventors: Leonid B. Sharivker, Shlomi (IL); Sergei Boulakhov, Shlomi (IL); Stephen M. George, Greensboro, NC (US); John Boyea, Greensboro, NC (US)

(73) Assignee: KENNAMETAL INC., Latrobe, PA (US)

( * ) Notice: Subject to any disclaimer, the term of this patent is extended or adjusted under 35 U.S.C. 154(b) by 68 days.

(21) Appl. No.: 17/519,267

(22) Filed: Nov. 4, 2021

(65) Prior Publication Data
US 2023/0133391 A1 May 4, 2023

(51) Int. Cl.
B23C 5/10 (2006.01)

(52) U.S. Cl.
CPC ............ *B23C 5/10* (2013.01); *B23C 2210/04* (2013.01)

(58) Field of Classification Search
CPC ................ B23C 5/10; B23C 2210/282; B23C 2210/086; B23C 2210/04; B23C 2210/246
See application file for complete search history.

(56) References Cited

U.S. PATENT DOCUMENTS

| 1,702,812 A | 2/1929 | Cochran |
|---|---|---|
| D79,821 S | 11/1929 | Labge |
| 1,977,845 A | 10/1934 | Emmons |
| 2,113,178 A | 4/1938 | Gase |
| 2,129,417 A | 9/1938 | Gase |
| 2,411,209 A | 11/1946 | Hall et al. |
| 3,156,154 A | 11/1964 | Stanaback |
| 3,456,316 A | 7/1969 | Dawson |
| 3,548,476 A | 12/1970 | Cave et al. |
| 3,715,788 A | 2/1973 | Ayer |

(Continued)

FOREIGN PATENT DOCUMENTS

| CA | 2534144 A1 | 7/2007 |
|---|---|---|
| CH | 675842 A5 | 11/1990 |

(Continued)

OTHER PUBLICATIONS

Dec. 28, 2021 Statement of Arguments filed by Iscar in opposition to Israel Patent Application No. 249676.

(Continued)

*Primary Examiner* — Alan Snyder
(74) *Attorney, Agent, or Firm* — Larry R. Meenan

(57) ABSTRACT

A rotary cutting tool includes a shank portion, a cutting portion, and a cutting tip. The cutting portion includes a plurality of blades and a plurality of flutes. Each blade includes a leading face, a trailing face, and a land surface extending between the leading face and the trailing face. The cutting end includes an end cutting edge having a first end face cutting edge portion formed with a positive, neutral or negative radial angle, a positive dish angle and a negative axial rake angle, and second end face cutting edge portion formed with a highly positive radial angle, a positive dish angle and a negative axial rake angle. The highly positive radial angle of the second end face cutting edge portion enables the rotary cutting tool to perform a ramp operation at very large ramp angles of between about 15-45 degrees.

12 Claims, 6 Drawing Sheets

(56) References Cited

U.S. PATENT DOCUMENTS

| | | |
|---|---|---|
| 3,775,819 A | 12/1973 | Ribich |
| 4,064,784 A | 12/1977 | Adler |
| 4,149,821 A | 4/1979 | Faber |
| 4,212,568 A | 7/1980 | Minicozzi |
| 4,285,618 A | 8/1981 | Shanley, Jr. |
| 4,330,229 A | 5/1982 | Croydon |
| 4,367,991 A | 1/1983 | Grafe et al. |
| 4,411,563 A | 10/1983 | Moon |
| 4,470,733 A | 9/1984 | Marques, Jr. |
| 4,497,600 A | 2/1985 | Kishimoto |
| 4,560,308 A | 12/1985 | Deller |
| 4,721,421 A | 1/1988 | Klinger |
| 4,740,121 A | 4/1988 | Arnold |
| 4,770,567 A | 9/1988 | Moriarty |
| 4,893,968 A | 1/1990 | Levy |
| 4,934,881 A | 6/1990 | Tsujimura et al. |
| 4,963,059 A | 10/1990 | Hiyama |
| 4,995,767 A | 2/1991 | Segal |
| 5,049,009 A | 9/1991 | Beck et al. |
| 5,094,573 A | 3/1992 | Hougen |
| 5,188,488 A | 2/1993 | Nakayama et al. |
| 5,203,653 A | 4/1993 | Kudla |
| 5,226,760 A | 7/1993 | Nishimura |
| 5,290,135 A | 3/1994 | Ball et al. |
| 5,322,394 A | 6/1994 | Okanishi et al. |
| 5,433,655 A | 7/1995 | Shiokawa et al. |
| 5,486,072 A | 1/1996 | Green |
| 5,622,462 A | 4/1997 | Gakhar |
| 5,685,671 A | 11/1997 | Packer et al. |
| 5,727,910 A | 3/1998 | Leeb |
| 5,779,399 A | 7/1998 | Kuberski |
| 5,807,032 A | 9/1998 | Abe |
| 5,810,517 A | 9/1998 | Bostic |
| 5,908,269 A | 6/1999 | Cox |
| 5,944,460 A | 8/1999 | Gill |
| 6,030,155 A | 2/2000 | Scheer et al. |
| 6,065,905 A | 5/2000 | Kinton |
| 6,082,935 A | 7/2000 | Hori |
| 6,095,723 A | 8/2000 | Reynolds et al. |
| D430,584 S | 9/2000 | Kouvelis |
| 6,158,927 A | 12/2000 | Cole et al. |
| 6,164,876 A | 12/2000 | Cordovano |
| 6,164,877 A | 12/2000 | Kamata et al. |
| 6,168,355 B1 | 1/2001 | Wardell |
| 6,193,446 B1 | 2/2001 | Aström et al. |
| 6,315,505 B1 | 11/2001 | Moore |
| 6,379,090 B1 | 4/2002 | Halley et al. |
| 6,394,466 B1 | 5/2002 | Matsumoto et al. |
| 6,439,811 B1 | 8/2002 | Wardell |
| 6,497,540 B1 | 12/2002 | Shikata et al. |
| 6,634,835 B1 | 10/2003 | Smith |
| 6,652,203 B1 | 11/2003 | Risen, Jr. |
| 6,655,880 B2 | 12/2003 | Macarthur |
| 6,773,209 B2 | 8/2004 | Craig |
| 6,846,135 B2 | 1/2005 | Kuroda et al. |
| 6,899,494 B2 | 5/2005 | Walrath |
| 6,929,434 B2 | 8/2005 | Prokop |
| 6,953,310 B2 | 10/2005 | Iwamoto et al. |
| 6,976,811 B1 | 12/2005 | DeRoche et al. |
| 6,976,815 B2 | 12/2005 | Berglöw et al. |
| 6,991,409 B2 | 1/2006 | Noland |
| 6,997,651 B2 | 2/2006 | Kawai et al. |
| 7,001,113 B2 | 2/2006 | Flynn et al. |
| 7,094,005 B2 | 8/2006 | Svensson |
| 7,125,210 B2 | 10/2006 | Kölker et al. |
| 7,153,067 B2 | 12/2006 | Greenwood et al. |
| 7,207,752 B2 | 4/2007 | Schulte |
| 7,214,006 B2 | 5/2007 | Flynn |
| 7,223,053 B2 | 5/2007 | Flynn |
| D549,249 S | 8/2007 | Omi |
| 7,306,408 B2 | 12/2007 | Wells et al. |
| 7,338,237 B2 | 3/2008 | Frejd |
| 7,367,754 B1 | 5/2008 | Greenwood et al. |
| 7,402,004 B2 | 7/2008 | Tanaka |
| 7,544,021 B2 | 6/2009 | Flynn |
| 7,563,059 B2 | 7/2009 | Song |
| 7,588,396 B2 | 9/2009 | Flynn |
| 7,618,219 B2 | 11/2009 | Osawa et al. |
| 7,753,624 B2 | 7/2010 | Günther et al. |
| 7,927,046 B2 | 4/2011 | Tanaka et al. |
| 8,221,036 B2 | 7/2012 | Volokh et al. |
| 8,366,354 B2 | 2/2013 | Davis |
| 8,690,492 B2 | 4/2014 | Azegami |
| 8,807,882 B2 | 8/2014 | Volokh |
| 9,211,593 B2 | 12/2015 | Budda et al. |
| 9,211,594 B2 | 12/2015 | Budda et al. |
| 9,227,253 B1 | 1/2016 | Swift et al. |
| 9,364,904 B2 | 6/2016 | Osawa et al. |
| D774,573 S | 12/2016 | Sharivker et al. |
| 9,555,486 B2 | 1/2017 | Baba et al. |
| 9,630,263 B2 | 4/2017 | Wells et al. |
| D792,489 S | 7/2017 | Sharivker et al. |
| D793,460 S | 8/2017 | Sharivker et al. |
| D798,921 S | 10/2017 | Frota de Souza Filho |
| D814,536 S | 4/2018 | Kawakami |
| D815,672 S | 4/2018 | Shikama |
| 10,160,046 B2 | 12/2018 | Sakai et al. |
| 10,537,945 B2 | 1/2020 | Boulakhov et al. |
| 2001/0031182 A1 | 10/2001 | Widin |
| 2002/0067964 A1 | 6/2002 | Sekiguchi et al. |
| 2002/0076283 A1 | 6/2002 | Kress et al. |
| 2002/0090273 A1 | 7/2002 | Serwa |
| 2002/0102140 A1 | 8/2002 | Thomas |
| 2002/0141833 A1 | 10/2002 | Macarthur |
| 2003/0053870 A1 | 3/2003 | Flynn et al. |
| 2003/0118411 A1 | 6/2003 | Flynn et al. |
| 2003/0175085 A1 | 9/2003 | Prokop |
| 2003/0198525 A1 | 10/2003 | Iwamoto et al. |
| 2004/0057803 A1 | 3/2004 | Walrath |
| 2004/0105729 A1 | 6/2004 | Giessler et al. |
| 2004/0117982 A1 | 6/2004 | Barcley |
| 2004/0120777 A1 | 6/2004 | Noland |
| 2004/0258490 A1 | 12/2004 | Walrath |
| 2005/0025584 A1 | 2/2005 | Kolker et al. |
| 2005/0084341 A1 | 4/2005 | Long, II et al. |
| 2005/0084352 A1 | 4/2005 | Borschert et al. |
| 2005/0105973 A1 | 5/2005 | Macarthur |
| 2005/0117982 A1 | 6/2005 | Dov et al. |
| 2006/0045637 A1 | 3/2006 | Flynn |
| 2006/0060053 A1 | 3/2006 | Tanaka et al. |
| 2006/0067797 A1 | 3/2006 | Calamia |
| 2006/0188345 A1 | 8/2006 | Greenwood et al. |
| 2006/0280567 A1 | 12/2006 | Craig |
| 2007/0098506 A1 | 5/2007 | Flynn |
| 2007/0154272 A1 | 7/2007 | Wells et al. |
| 2007/0160429 A1 | 7/2007 | Volokh |
| 2007/0237594 A1 | 10/2007 | Lang et al. |
| 2007/0243030 A1 | 10/2007 | Staedt et al. |
| 2007/0248422 A1 | 10/2007 | Song |
| 2007/0286691 A1 | 12/2007 | Glimpel |
| 2007/0297864 A1 | 12/2007 | De |
| 2008/0014421 A1 | 1/2008 | Inspektor et al. |
| 2008/0101877 A1 | 5/2008 | Engin |
| 2008/0206003 A1 | 8/2008 | Flynn |
| 2009/0060663 A1 | 3/2009 | Rouge et al. |
| 2009/0232610 A1 | 9/2009 | Takagi et al. |
| 2010/0003089 A1 | 1/2010 | Horiike et al. |
| 2010/0054881 A1 | 3/2010 | Thomas et al. |
| 2010/0143052 A1 | 6/2010 | Aoki et al. |
| 2010/0187019 A1 | 7/2010 | Swope et al. |
| 2010/0209201 A1 | 8/2010 | Davis |
| 2010/0215447 A1 | 8/2010 | Davis |
| 2010/0272529 A1 | 10/2010 | Rozzi et al. |
| 2010/0322723 A1 | 12/2010 | Danielsson |
| 2011/0150583 A1 | 6/2011 | Engstrom |
| 2012/0003057 A1 | 1/2012 | Leyba |
| 2012/0034043 A1 | 2/2012 | Krieg et al. |
| 2012/0087753 A1 | 4/2012 | Kataoka et al. |
| 2012/0183363 A1 | 7/2012 | Davis et al. |
| 2012/0201619 A1 | 8/2012 | Olsson |
| 2013/0266389 A1 | 10/2013 | Hecht |
| 2014/0003873 A1 | 1/2014 | Han et al. |
| 2014/0133926 A1 | 5/2014 | Budda et al. |
| 2014/0193220 A1 | 7/2014 | Tamura et al. |

(56) References Cited

U.S. PATENT DOCUMENTS

| | | |
|---|---|---|
| 2014/0212230 A1 | 7/2014 | Imaizumi et al. |
| 2014/0356081 A1 | 12/2014 | Davis |
| 2015/0210910 A1 | 7/2015 | Hejtmann et al. |
| 2015/0251254 A1 | 9/2015 | Mutlu et al. |
| 2015/0258616 A1 | 9/2015 | Stanbach et al. |
| 2016/0067796 A1 | 3/2016 | Budda et al. |
| 2016/0082526 A1 | 3/2016 | Swift et al. |
| 2016/0256939 A1 | 9/2016 | Miyamoto |
| 2016/0303664 A1 | 10/2016 | Azegami et al. |
| 2020/0254539 A1* | 8/2020 | Sharivker ............... B23C 5/10 |

FOREIGN PATENT DOCUMENTS

| | | |
|---|---|---|
| CH | 701414 A1 | 1/2011 |
| CN | 1034881 A | 8/1989 |
| CN | 1475322 A | 2/2004 |
| CN | 2841207 Y | 11/2006 |
| CN | 101085474 A | 12/2007 |
| CN | 101247914 A | 10/2010 |
| CN | 101326026 | 3/2011 |
| CN | 104023884 A | 9/2014 |
| CN | 104209566 A | 12/2014 |
| CN | 104640658 A | 5/2015 |
| CN | 105555448 A | 5/2016 |
| CN | 105618829 A | 6/2016 |
| CN | 105682837 A | 6/2016 |
| DE | 1042873 B | 11/1958 |
| DE | 1177904 B | 9/1964 |
| DE | 3623175 A1 | 1/1988 |
| DE | 3623176 A1 | 1/1988 |
| DE | 3805727 C2 | 7/1991 |
| DE | 4117486 A1 | 12/1992 |
| DE | 20310713 U1 | 9/2003 |
| DE | 10225481 A1 | 12/2003 |
| DE | 202006016531 | 7/2007 |
| DE | 112011102667 T5 | 7/2013 |
| DE | 102014106886 A1 | 12/2014 |
| DE | 102015218511 A1 | 3/2016 |
| DE | 102016104158 A1 | 9/2016 |
| EP | 0365218 A1 | 4/1990 |
| EP | 0477093 B1 | 6/1993 |
| EP | 0893185 A1 | 1/1999 |
| EP | 3067136 A1 | 9/2016 |
| FR | 2875722 A1 | 3/2006 |
| GB | 1285076 | 8/1972 |
| GB | 2240740 A | 8/1991 |
| JP | S305244 B1 | 7/1928 |
| JP | S5542760 A | 3/1980 |
| JP | S5590212 A | 7/1980 |
| JP | S56134112 A | 10/1981 |
| JP | S5734913 U | 2/1982 |
| JP | S59176713 U | 10/1984 |
| JP | S59176713 U | 11/1984 |
| JP | S62178011 A | 8/1987 |
| JP | S62141413 U | 9/1987 |
| JP | S62203711 A | 9/1987 |
| JP | S6386923 U | 6/1988 |
| JP | S63116214 U | 7/1988 |
| JP | H01135408 A | 5/1989 |
| JP | H02106210 A | 4/1990 |
| JP | 02256412 | 10/1990 |
| JP | H03131414 A | 6/1991 |
| JP | H05138421 A | 6/1993 |
| JP | 06126521 A | 5/1994 |
| JP | 8168915 | 7/1996 |
| JP | 08507724 | 8/1996 |
| JP | H0925863 A | 1/1997 |
| JP | H09136209 A | 5/1997 |
| JP | H09267211 A | 10/1997 |
| JP | H09309020 A | 12/1997 |
| JP | H10138031 A | 5/1998 |
| JP | H11179611 A | 7/1999 |
| JP | H11277320 A | 10/1999 |
| JP | 2001054812 | 2/2001 |
| JP | 2001121340 | 5/2001 |
| JP | 2002018627 A | 1/2002 |
| JP | 3304116 B2 | 7/2002 |
| JP | 2002187011 A | 7/2002 |
| JP | 2002200512 A | 7/2002 |
| JP | 2002273612 | 9/2002 |
| JP | 2002292515 | 10/2002 |
| JP | 2003326414 A | 11/2003 |
| JP | 2004082306 A | 3/2004 |
| JP | 2004141975 A | 5/2004 |
| JP | 2004142055 A | 5/2004 |
| JP | 2004209559 A | 7/2004 |
| JP | 3104686 U | 10/2004 |
| JP | 2005199393 A | 7/2005 |
| JP | 2005224898 A | 8/2005 |
| JP | 2005246492 | 9/2005 |
| JP | 2007136626 A | 6/2007 |
| JP | 2007136627 A | 6/2007 |
| JP | 2008502490 A | 1/2008 |
| JP | 2008036722 | 2/2008 |
| JP | 2008068345 A | 3/2008 |
| JP | 2008512252 A | 4/2008 |
| JP | 2009056533 A | 3/2009 |
| JP | 5754019 B2 | 7/2015 |
| JP | 5806931 B2 | 11/2015 |
| KR | 930001459 B1 | 2/1993 |
| RU | 2010682 C1 | 4/1994 |
| SU | 558781 A1 | 5/1977 |
| SU | 631271 A1 | 11/1978 |
| SU | 1701440 A1 | 12/1991 |
| WO | 9421412 A1 | 9/1994 |
| WO | 2005122690 A2 | 12/2005 |
| WO | 2006028887 A1 | 3/2006 |
| WO | WO2006028886 A1 | 3/2006 |
| WO | 2006041353 A1 | 4/2006 |
| WO | 2007013447 A1 | 2/2007 |
| WO | WO2007123326 A1 | 11/2007 |
| WO | WO2015068824 A1 | 5/2015 |
| WO | WO2016056266 A1 | 4/2016 |

OTHER PUBLICATIONS

D28, JIS-1998, Japanese JIS Tools Handbook, B0172, Statement of arguments filed by Iscar in opposition filed in Israel Dec. 28, 2021 App. No. 249676.
D27D, 2002 Iscar's product 5621811, Statement of arguments filed by Iscar in opposition filed in Israel Dec. 28, 2021 App. No. 249676.
D27A, Iscar Cutting Tools—Metal Working Tools—ECA-B-3, 5621811—ECA-B-3 20-38C20-104, Statement of arguments filed by Iscar in opposition filed in Israel Dec. 28, 2021 App. No. 249676.
D26B, Walter 2003-2016 Grinding Manual and Simulation, Walter second dish option, Statement of arguments filed by Iscar in opposition filed in Israel Dec. 28, 2021 App. No. 249676.
D26A, Walter 2003-2016 Grinding Manual and Simulation, Walter second dish angle, Statement of arguments filed by Iscar in opposition filed in Israel Dec. 28, 2021 App. No. 249676.
D25A, 2015 ANCAs Tool Room software, Statement of arguments filed by Iscar in opposition filed in Israel Dec. 28, 2021 App. No. 249676.
D25, 2009 ANCA iGrind Grinding Manual, Statement of arguments filed by Iscar in opposition filed in Israel Dec. 28, 2021 App. No. 249676.
D24C, List of curves—Wikipedia, Statement of arguments filed by Iscar in opposition filed in Israel Dec. 28, 2021 App. No. 249676.
D24B, Curved Lines Meaning, Examples, Types and FAQs, Statement of arguments filed by Iscar in opposition filed in Israel Dec. 28, 2021 App. No. 249676.
D24A, Definition of Curve—Wikipedia, Statement of arguments filed by Iscar in opposition filed in Israel Dec. 28, 2021 App. No. 249676.
D23, National Aerospace Standard, 1973, pp. V142-V151, V26-V29, Statement of arguments filed by Iscar in opposition filed in Israel Dec. 28, 2021 App. No. 249676.
Nov. 28, 2021 Notice of Opposition.
Nov. 29, 2021 Opposition IL App. No. 249676.
Jun. 25, 2021 Notice of Allowance—CN App. No. 201711381500.4.

(56) References Cited

OTHER PUBLICATIONS

Apr. 26, 2021 Notice of Allowance—IL App. No. 249676.
Jan. 5, 2021 Foreign OA—CN App. No. 201711381500.4.
Jun. 18, 2020 Foreign OA—IL App. No. 249676.
Jul. 5, 2020 Foreign OA—CN App. No. 201711381500.4.
Apr. 15, 2020 Notice of Allowance U.S. Appl. No. 16/111,828.
Mar. 18, 2020 Final OA US App. No. 20190061021.
Sep. 12, 2019 Notice of Allowance US App. No. 20180169773.
Sep. 9, 2019 Non-Final OA US App. No. 20190061021.
Aug. 22, 2019 Final OA US App. No. 20100209201.
May 6, 2019 Foreign OA DE App. No. 102018120182A1.
Apr. 12, 2019 Notice of Allowance US App. No. D858594.
Apr. 11, 2019 Notice of Allowance US App. No. D860273.
Apr. 11, 2019 Notice of Allowance US App. No. D858595.
Apr. 9, 2019 Notice of Allowance US App. No. 20100209201.
Feb. 26, 2019 Non-Final OA US App. No. 20100209201.
Feb. 7, 2019 Non-Final OA US App. No. 20180169773A1.
Jan. 20, 2019 Foreign OA IL App. No. 254172.
Oct. 15, 2018 Foreign OA Ep App. No. 2398615.
Oct. 12, 2018 Non-Final OA US App. No. D860273.
Oct. 12, 2018 Non-Final OA US App. No. D858595.
Oct. 12, 2018 Non-Final OA US App. No. D858594.
Oct. 12,2018 Non-Final OA US App. No. D858593.
Sep. 24, 2018 Foreign OA DE App. No. 102017129413A1.
Aug. 12, 2018 Office Action (non-US) IL App. No. 249676.
Jun. 4, 2018 Final OA US App. No. 20100209201.
Nov. 17, 2017 Office action (3 months) 4 US App. No. 20100209201.
Aug. 24, 2017 Advisory Action (PTOL-303) 3 US App. No. 20100209201.
Jun. 16, 2017 Final Office Action 3.
Dec. 16, 2016 Office action (3 months) 4.
Feb. 29, 2016 Notice of Allowance.
Dec. 17, 2015 Decision to Grant.
Jul. 27, 2015 First office action CN103769662A.
Apr. 29, 2015 Office action (1 month) CN102325619A.
International Preliminary Report on Patentability for International Application No. PCT/EP2009/003531, dated Aug. 13, 2010, 16 Pages.
International Preliminary Report on Patentability for International Application No. PCT/IL2007/000409, dated Apr. 19, 2013, 9 Pages.
International Preliminary Report on Patentability for International Application No. PCT/IL2007/000978, dated Feb. 10, 2009, 4 Pages.
International Search Report with Written Opinion for International Application No. PCT/EP2009/003531, dated Oct. 2, 2009, 8 pages.
International Search Report with Written Opinion for International Application No. PCT/IL2007/000409, dated Sep. 19, 2008, 8 pages.
International Search Report with Written Opinion for International Application No. PCT/IL2007/000978, dated Sep. 29, 2008, 4 pages.
"Inter-State Standard End Mills with Cylindrical Shank Design and Dimensions", GOST 17025-71, 2005, pp. 1-16.
Japanese Patent Office, Japanese Notice of Reasons for Rejection for 2009-523443 (Office Action) and English translation thereof, dated Jun. 19, 2012, 6 pp.
Karasev V.Y., "End and Cylindrical Milling Cutters With Irregular Circular Tooth Pitch," Excerpt from a Russian Text Book, 1959, 7 pages.
Khandani S., "Engineering Design Process," Aug. 2005, 24 pages, [Retrieved on Dec. 31, 2013] Retrieved from URL: http://www.saylor.org/site/wp-content/uploads/2012/09/ME101-4.1-Engineering-Design-Process.pdf.
Korean Intellectual Property Office, "Non-Final Rejection" KR10-2009-7002227 (and English language translation thereof), Aug. 23, 2012, 19 pp.
Modern Metal Cutting A Practical Handbook, pp. 30-31,X-22-X-25, XII-8-XII-9, XP055397503.
"New End MIII", Iron Age, New York, NY, US, (19641203), vol. 193, No. 11, p. 166, XP002113840.
Russian Patent Office 2413-157209RU/531, Official Action, 10 pp.
"Tool and Manufacturing Engineers Handbook," Society of Manufacturing Engineers, Fourth Edition, 1983, vol. 1, 6 Pages.
Wu S. M., et al., "Computer Design of a Vibration-Free Face-Milling Cutter," Journal of Engineering for Industry, (19750800).
Jan. 24, 2008 Notice of Allowance U.S. Appl. No. 29/289,305, 9 Pages.
Sep. 3, 2008 Notice of Allowance U.S. Appl. No. 29/302,720, 9 Pages.
Sep. 4, 2008 Notice of Allowance U.S. Appl. No. 29/302,719, 9 Pages.
Jun. 29, 2011 Non-Final Office Action U.S. Appl. No. 12/376,590, 9 Pages.
Nov. 25, 2011 Final Office Action U.S. Appl. No. 12/376,590, 12 Pages.
Dec. 23, 2011 Advisory Action (PTOL-303) U.S. Appl. No. 12/245,421 3 pages.
Mar. 27, 2012 Notice of Allowance U.S. Appl. No. 12/376,590, 7 Pages.
Apr. 11, 2012 "Requisitions by the Examiner" for Canadian App. No. CA2725848, 2 pages.
Dec. 19, 2012 Advisory Action (PTOL-303) U.S. Appl. No. 12/245,421 2 pages.
Jan. 3, 2013 Non-Final Office Action U.S. Appl. No. 12/989,931, 20 Pages.
Jun. 20, 2013 Final Office Action U.S. Appl. No. 12/989,931, 10 Pages.
Aug. 28, 2013 Advisory Action (PTOL-303) U.S. Appl. No. 12/989,931 3 pages.
Oct. 25, 2013 Non-Final Office Action U.S. Appl. No. 12/989,931, 9 Pages.
Nov. 5, 2013 JP2011510868, 3 pages.
Jan. 8, 2014 Non-Final Office Action US Application No. 13/550,184, 23 Pages.
Feb. 6, 2014 KR102009-7002227 Notice of Last Non-Final Rejection, 7 pages.
Apr. 3, 2014 Final Office Action U.S. Appl. No. 12/989,931, 12 Pages.
Jun. 10, 2014 Final Office Action U.S. Appl. No. 13/550,184, 9 Pages.
Jun. 30, 2014 Advisory Action (PTOL-303) U.S. Appl. No. 12/989,931 3 pages.
Jul. 21, 2014 Notification of Re-examination dated CN200780015384. 2, 9 pages.
Aug. 21, 2014 Advisory Action (PTOL-303) U.S. Appl. No. 13/550,184 2 pages.
Aug. 28, 2014 Non-Final Office Action U.S. Appl. No. 12/989,931, 11 Pages.
Sep. 24, 2014 Office Action JP App. No. 2013-266598, 6 pages.
Nov. 17, 2014 Office Action IL2013-7019915, 3 pages.
Dec. 11, 2014 Non-Final Office Action U.S. Appl.n No. 13/550,184, 14 Pages.
Mar. 5, 2015 Final Office Action U.S. Appl. No. 12/989,931, 14 Pages.
Apr. 28, 2015 Notice of Reasons for Rejection (with English language translation) for corresponding JP Appeal 2014-4158 (JP Appl. No. 2011-510868), 10 pages.
May 13, 2015 Final Office Action U.S. Appl. No. 13/550,184, 11 Pages.
Aug. 3, 2015 Advisory Action (PTOL-303) U.S. Appl. No. 13/550,184 4 pages.
Sep. 1, 2015 Notice of Allowance 2011-521794, 3 pages.
Sep. 8, 2015 Notice of Allowance JP App. No. 2014-041480, 9 pages.
Sep. 30, 2015 Non-Final Office Action U.S. Appl. No. 12/989,931, 16 Pages.
Jan. 19, 2016 Third Office Action JP App. No. 2014-041480, 3 pages.
Feb. 16, 2016 Notice of Allowance U.S. Appl. No. 12/989,931, 7 Pages.
May 2, 2016 Non-Final Office Action U.S. Appl. No. 12/989,931, 9 Pages.
Jun. 2, 2016 Notice of Allowance U.S. Appl. No. 12/989,931, 7 Pages.
Sep. 23, 2016 Notice of Allowance U.S. Appl. No. 12/989,931, 10 Pages.

(56) References Cited

OTHER PUBLICATIONS

Jan. 13, 2017 Non-Final Office Action U.S. Appl. No. 14/683,692, 7 Pages.
Jun. 16, 2017 Final Office Action U.S. Appl. No. 14/683,692, 7 Pages.
Sep. 14, 2017 Advisory Action (PTOL-303) U.S. Appl. No. 14/683,692 2 pages.
Oct. 12, 2017 Notice of Allowance U.S. Appl. No. 14/683,692, 6 Pages.
Sep. 25, 2018 English translation Office Action DE Application No. 102017129413.9, 5 Pages.
Sep. 26, 2022 Foreign Office Action German Application No. 102017129413.9, 10 pages.
Dec. 27, 2022 Foreign Office Action Israel Application No. 293041, 5 Pages.
Alan Richter, "Variations on a Theme", Cutting Tool Engineering, (20041000), vol. 56, No. 10.
"Cutting Fluids for Machining & Speeds and Feeds", Machinery's Handbook 25th edititon, (19970000), Hanita Metal Works Ltd, p. 974,1063.
"End Mills with Conical Shank," State Standard 17026-71, M., 1986, 4 pages.
European Search Report for European Application No. 00113152.3, dated May 24, 2002, 3 Pages.
Extended European Search Report for European Application No. 07736149.1, dated Feb. 8, 2012, 5 Pages.
Extended European Search Report for European Application No. 07790033.0, dated Jan. 12, 2010, 7 Pages.

\* cited by examiner

ROTARY CUTTING TOOL WITH HIGH RAMP ANGLE CAPABILITY

FIELD OF THE DISCLOSURE

In general, the disclosure relates to cutting tools for performing machining operations on a workpiece. In particular, the disclosure relates to a rotary cutting tool, such as a solid end mill, and the like, having an end face cutting edge with a radially outer curved rake face with a negative radial angle and a radially inner curved rake face with a highly positive radial angle for providing to maximize ramping feed rate, while extending tool life.

BACKGROUND OF THE DISCLOSURE

Conventional solid end mills having cutting edges disposed on both end surfaces and peripheral surfaces are frequently used in operation where it is desired that the tool remove material in both the axial and radial directions, as in the case of slotting operations.

Unfortunately, solid end mills experience performance difficulties, especially when ramping on an inclined tool path (i.e., ramping angle) while entering the workpiece. It has been observed that the steeper the ramping angle gets, the higher the risk of failure of the end mill. It has also been observed that the higher the number of blades and flutes of the end mill, lower ramping angles become practically impossible, digressing at an exponential fashion.

Managing chip formation and evacuation during ramping operations requires deep and sufficiently wide gashes at the end face, which lead to concerns about the structural strength of the end mill. In addition, a large number of flutes leads to even more design and performance concessions. Thus, it would be desirable to provide a rotary cutting tool, such as a solid end mill, and the like, that overcomes the problems mentioned above.

SUMMARY OF THE DISCLOSURE

The problem of providing a rotary cutting tool capable of very large ramping angles, while managing chip formation and evacuation, is solved by providing a rotary cutting tool, such as a solid end mill, and the like, having an end cutting edge with an end face configuration comprising at least two end face cutting edge portions, wherein each end face cutting edge portion is responsible for different fragments and/or ramping angles of a working tool path, while maintaining the overall structural stability of the rotary cutting tool.

In one embodiment, each end cutting edge comprises a first end face cutting edge portion and a second end face cutting edge portion. The first end face cutting edge portion is adjacent (i.e., adjoins) a cutting corner, which is proximate the outer diameter of the cutting tool. The first end face cutting edge portion is designed for moderate ramp angles of between about 3 degrees and about 5 degrees. In addition, the first end face cutting edge portion can have a curved and complex profile, or a straight and complex profile, or any combination thereof. Further, the first end face cutting edge portion can have either a positive radial angle or negative radial angle, depending on the material to be machined. For example, the radial angle can be between about +2 degrees and about −2 degrees for machining high temperature alloys, and the like. Still further, the first end face cutting edge portion can have a negative axial rake angle, depending on the material to be machined. For example, the axial rake angle can be between about −1 degrees and about −5 degrees for machining high temperature alloys, and the like.

The second end face cutting edge portion is radially inward and adjacent to (i.e., adjoins) the first end face cutting edge portion and generally faces the center of rotation. The second end face cutting edge portion is designed for large ramp angles of between about 15 degrees and about 45 degrees. The second end face cutting edge portion can have a curved and complex profile, or a straight and complex profile, or any combination thereof, but must follow an inward (i.e., center) pointing curved or radii profile. In addition, the second end face cutting edge portion has a highly positive radial angle, depending on the material to be machined. For example, the radial angle can be between about +11 degrees and about +15 degrees for machining high temperature alloys, and the like. Further, the second end face cutting edge portion can have a negative axial rake angle, depending on the material to be machined. For example, the axial rake angle can be between about −1 degrees and about −5 degrees for machining high temperature alloys, and the like.

Testing of the rotary cutting tool of the disclosure with five flutes achieved ramp angles of +45 degrees in titanium 6-4 without slowing down federates, while cutting smooth and outperforming conventional "center-cut" and "non-center-cut" solid end mills.

In one aspect, a rotary cutting tool comprises a shank portion and a cutting portion adjoining the shank portion and having a cutting end. The cutting portion has a plurality of blades separated by flutes. Each blade includes a leading face, a trailing face, and a land surface extending between the leading face and the trailing face. Each blade includes an end cutting edge extending from an outer diameter of the cutting portion towards the central, longitudinal axis, and a peripheral cutting edge at an intersection between the leading face and the land surface. The end cutting edge includes a first end face cutting edge portion proximate an outer diameter of the rotary cutting tool, and a second end face cutting edge portion adjoining the first end face cutting edge portion. The first end face cutting edge portion defines a first axial rake angle between about −1 degrees and about −15 degrees and a first radial angle between about −2 degrees and about 2 degrees, and the second end face cutting edge portion defines a second axial rake angle between about −1 degrees and about −15 degrees and a second radial angle between about 11 degrees and about 15 degrees, thereby enabling the rotary cutting tool to perform a ramp operation with a ramp angle between about 15 degrees and about 45 degrees.

In another aspect, a rotary cutting tool comprises a shank portion and a cutting portion adjoining the shank portion and having a cutting end. The cutting portion has a plurality of blades separated by flutes. Each blade includes a leading face, a trailing face, and a land surface extending between the leading face and the trailing face. Each blade includes an end cutting edge extending from an outer diameter of the cutting portion towards the central, longitudinal axis, and a peripheral cutting edge at an intersection between the leading face and the land surface. The end cutting edge includes a first end face cutting edge portion proximate an outer diameter of the rotary cutting tool, and a second end face cutting edge portion adjoining the first end face cutting edge portion. The first end face cutting edge portion defines a first axial rake angle between about −1 degrees and about −15 degrees, a first dish angle between about 1 degree and about 8 degrees and a first radial angle of between about −2 degrees and about 2 degrees, and the second end face cutting edge portion defines a second axial rake angle between about −1 degrees and about −15 degrees, a second dish angle between about 21 degrees and about 45 degrees and a second radial angle between about 11 degrees and about 15 degrees, thereby enabling the rotary cutting tool to perform a ramp operation with a ramp angle between about 15 degrees and about 45 degrees.

BRIEF DESCRIPTION OF THE DRAWINGS

While various embodiments of the disclosure are illustrated, the particular embodiments shown should not be construed to limit the claims. It is anticipated that various changes and modifications may be made without departing from the scope of this disclosure.

DETAILED DESCRIPTION OF THE DISCLOSURE

Figure 1:
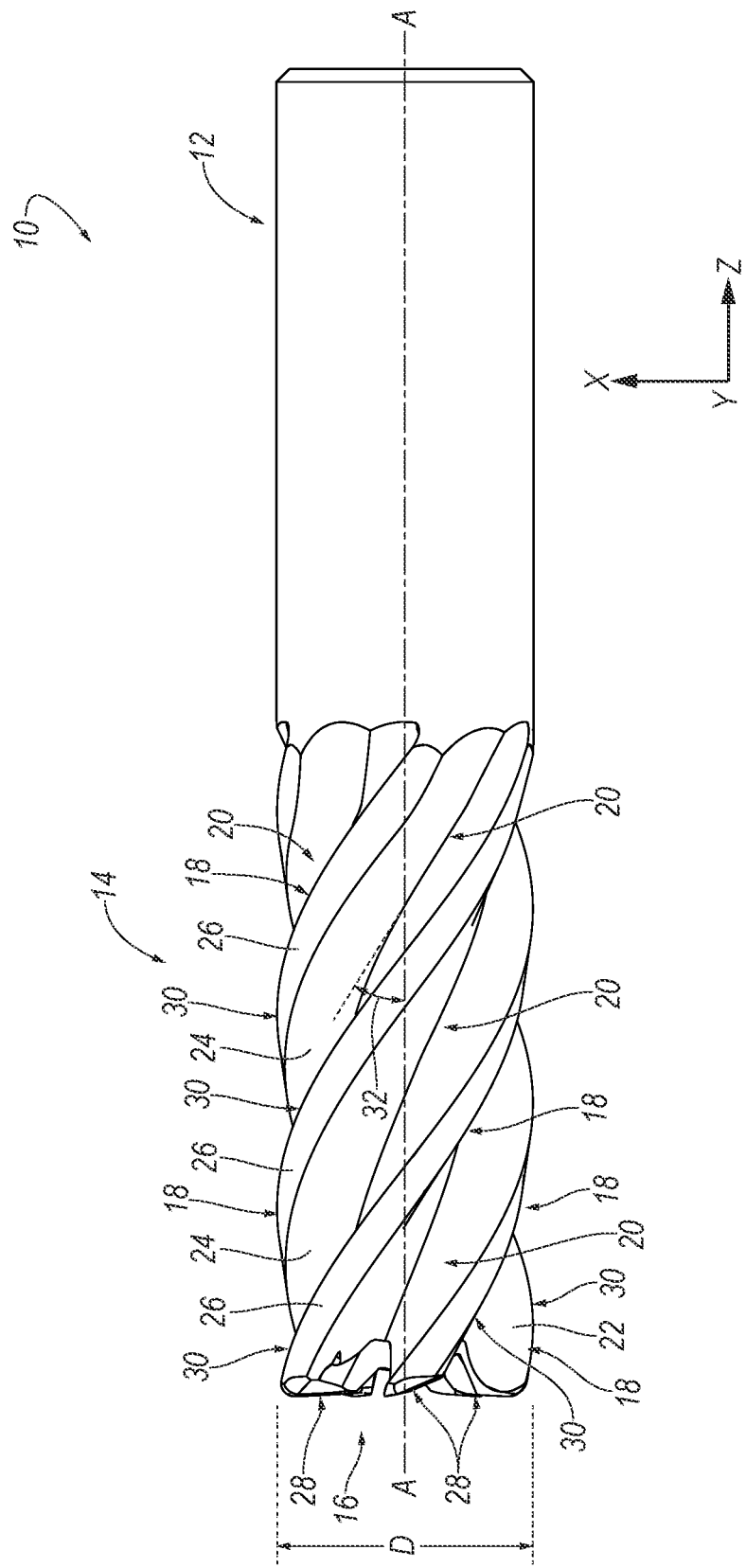
FIG. 1 is a side view of a rotary cutting tool, such as an end mill, according to an embodiment of the disclosure.
Figure 2:
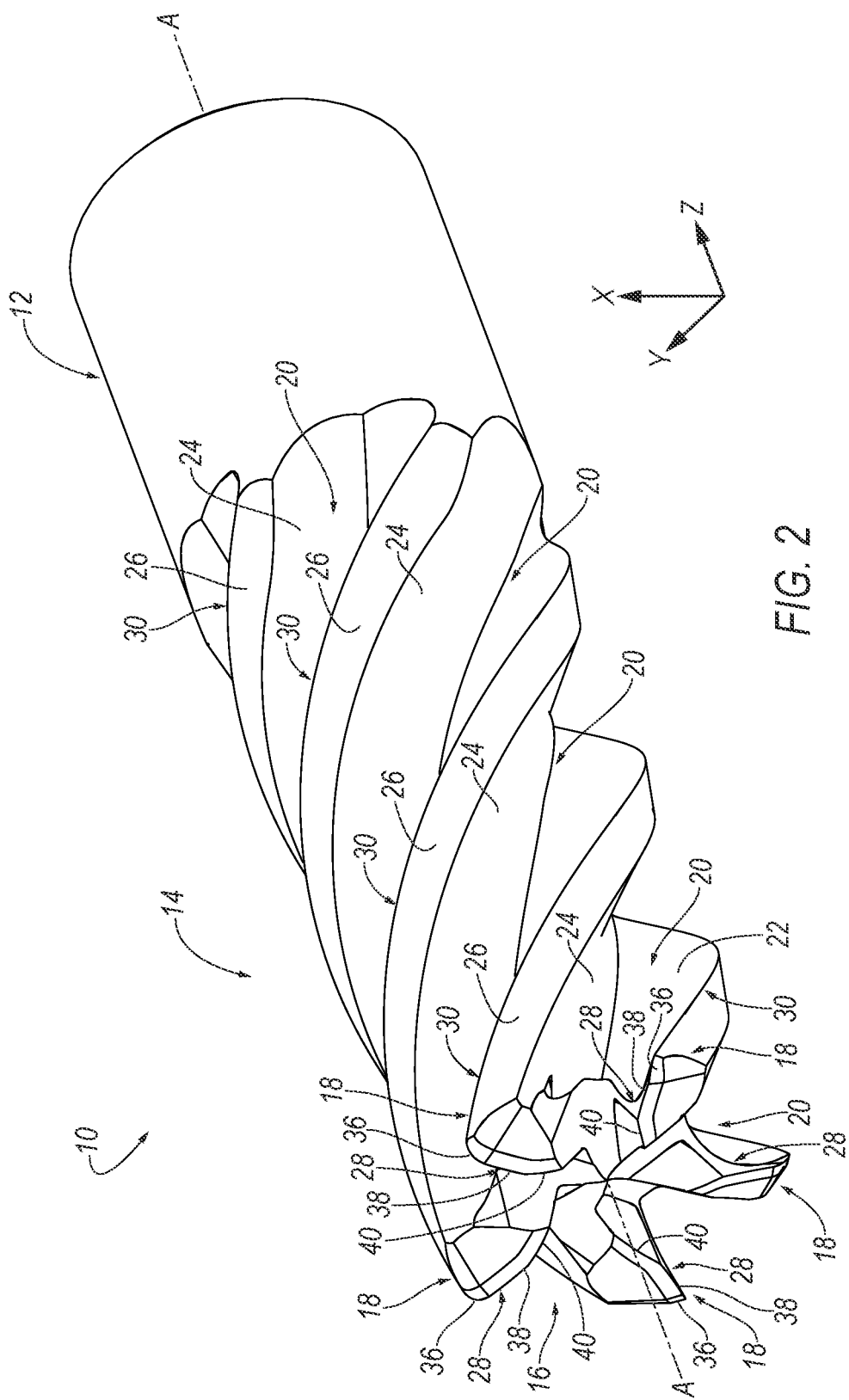
FIG. 2 is an isometric view of the rotary cutting tool of FIG. 1.

As used herein, directional phrases, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this disclosure pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Referring now to FIGS. 1-5, a rotary cutting tool 10 is shown according to an embodiment of the disclosure. In general, the rotary cutting tool 10, such as an end mill, is elongate and has a central, longitudinal axis, A-A, which can also be considered as the rotational axis. As used herein, the term "elongate" or "elongated" is defined as something that is longer than it is wide. In other words, the width is smaller than its length.

Figure 3:
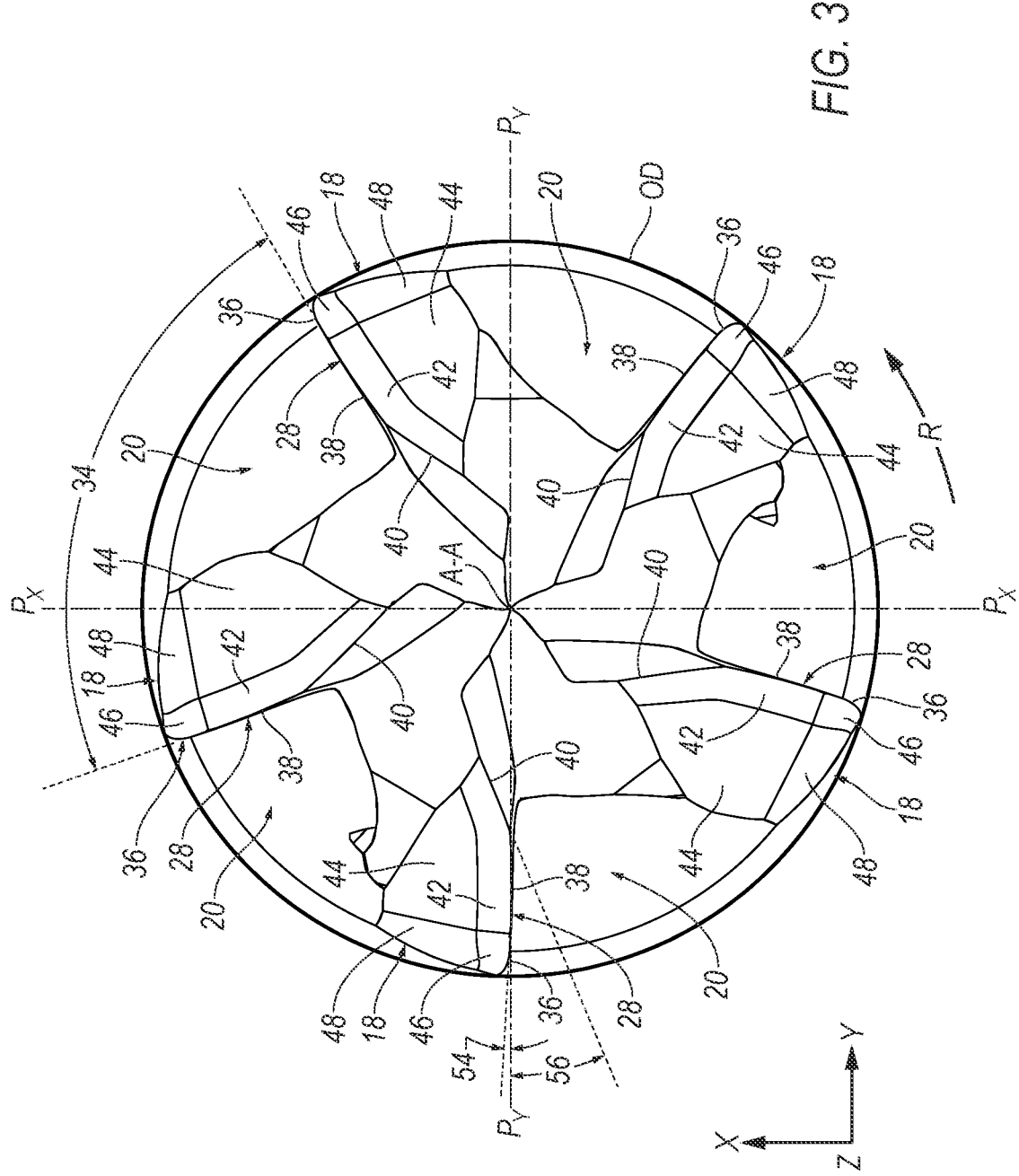
FIG. 3 is an end view of the rotary cutting tool of FIG. 1.

The rotary cutting tool 10 comprises a shank portion 12 and a cutting portion 14 adjoining the shank portion 12. The cutting portion 14 defines a cutting diameter, D, and includes a plurality of blades 18 separated by flutes 20 extending the length of the cutting portion 14. In the illustrated embodiment, the end mill 10 has a total of five (5) blades 18 and flutes 20. However, it will be appreciated that the invention is not limited by the number of blades and flutes, and that the invention can be practiced with a fewer or a greater number of blades and flutes. For example, the invention can be practiced with two blades and flutes, three blades and flutes, four blades and flutes, six blades and flutes, seven blades and flutes, eight blades and flutes, nine blades and flutes, ten blades and flutes, and the like. The end mill 10 rotates in a direction of the arrow, R (FIG. 3). Each blade 18 has a leading face 22, a trailing face 24, and a land surface 26 bridging the leading face 22 and trailing face 24. In addition, each blade 18 has an end face cutting edge 28 and a peripheral cutting edge 30 at the intersection between the leading face 22 and the land surface 26. It should be appreciated that the land surface 26 acts as a relief surface for the peripheral cutting edge 30.

As used herein, axial rake angle is defined as the angle between the cutter tooth face of a blade of a milling cutter or reamer and a line parallel to its axis of rotation.

Radial rake angle is defined as the angle between the cutter tooth face of a blade and a radial line passing through the cutting edge in a plane perpendicular to the cutter axis.

End rake angle is defined as the angle between the cutting tip at the end of a blade and a radial line passing through the cutting edge in a plane perpendicular to the cutter axis.

Positive axial rake angle is defined as a rake geometry indicating that the that the cutting edge is positioned on the axial centerline of the cutter with the top surface of the cutting edge sloping back and away from the axial centerline.

Positive radial rake angle is defined as a rake geometry indicating that the cutting edge is positioned on the radial centerline of the cutter with the top surface of the cutting edge sloping back and away from the radial centerline.

Positive end rake angle is defined as a rake geometry indicating that the cutting tip at the end of the blade is positioned on the radial centerline of the cutter with the cutting tip sloping back and away from the radial centerline.

Ramp milling is defined as a combination of Z-axis movement simultaneous with X, Y, or combined axis movement.

Dish angle is defined as the angle formed by the end cutting edge with respect to a plane perpendicular to the cutter axis.

Helix angle is defined as the angle made by the leading face of the land with a plane containing the cutter axis.

Ramp angle is defined as the angle made by the cutter when moving the cutter in both the Z-axis direction and an additional axis (X- or Y-axis) relative to the work, and is defined by the equation:

$$\text{Ramp Angle} = \text{ARCTAN}((Z\text{-axis feed})/(X\_Y\text{-axis feed})) \qquad (1)$$

A high ramp angle is defined as a ramp angle of at least 10 degrees.

As shown in FIGS. 1-5, the end cutting edge 20 of each blade 18 extends from an outer diameter, OD, of the cutting portion 14 towards the central longitudinal axis, A-A. The end cutting edge 20 of each blade 18 defines a dish profile and a radial profile. As described herein, dish profile refers to the profile or shape of an end cutting portion of a blade when viewed from a side of the cutting tool, as shown in FIG. 1. As used herein, a radial profile refers to the profile of the end cutting portion of a blade when viewed from an end of the cutting tool, as shown in FIG. 3. In the illustrated embodiment, each blade 18 extends less than the full distance from the outer diameter, OD, to the central longitudinal axis, A-A. However, it should be appreciated that the principles of the invention can be practiced with a rotary cutting tool in which each blade 18 extends the full distance from the outer diameter, OD, to the central longitudinal axis, A-A.

The blades 18 and flutes 20 of the cutting portion 14 extend helically within the cutting portion 14 at a helix angle 32 of between about 30 degrees and about 45 degrees with respect to the central, longitudinal axis, A-A. In other embodiments, the blades 18 and flutes 20 are "straight flutes" that extend substantially parallel to the central, longitudinal axis, A-A. In the illustrated embodiment, the blades 18 and flutes 20 of the cutting portion 14 extend helically within the cutting portion 14 at a helix angle 32 of about 38 degrees.

Referring now to FIG. 3, the angular spacing 34 between adjacent blades 18 and flutes 20 is substantially unequal to minimize vibration during a machining operation. In the illustrated embodiment, for example, the angular spacing 34 may be between about 62 degrees to about 80 degrees. However, it will be appreciated that the invention is not limited by unequally spaced blades and flutes, and that the invention can be practiced with equally spaced blades and flutes (i.e., 360/5=72 degrees).

As shown in FIG. 3, the end face cutting edge 28 of each blade 18 includes a corner cutting edge 36 proximate the outer diameter, OD, of the end mill 10. In the illustrated embodiment, the corner cutting edge 36 is formed with a radius for providing strength to the corner cutting edge 36. However, it will be appreciated that the invention is not limited by having a radiused corner cutting edge 36, and that the invention can be practiced with a sharp corner cutting edge (i.e., without a radius), a chamfered corner cutting edge, and the like. The end face cutting edge 28 further includes a first end face cutting edge portion 38 adjoining the corner cutting edge 36, and a second end face cutting edge portion 40 adjoining the first end face cutting edge portion 38. In the illustrated embodiment, the first end face cutting edge portion 38 is disposed radially outward with respect to the second end face cutting edge portion 40. In other words, the second end face cutting edge portion 40 is disposed radially inward with respect to the first end face cutting edge portion 38. In the illustrated embodiment, the end face cutting edge 28 does not extend the entire distance from the outer diameter, OD, to the central, longitudinal axis, A-A. However, it will be appreciated that the invention is not limited by the length of the end face cutting edge 28, and that the invention can be practiced with the end face cutting edge 28 extending the entire distance from the outer diameter, OD, to the central, longitudinal axis, A-A, of the cutting tool 10.

Figure 5:
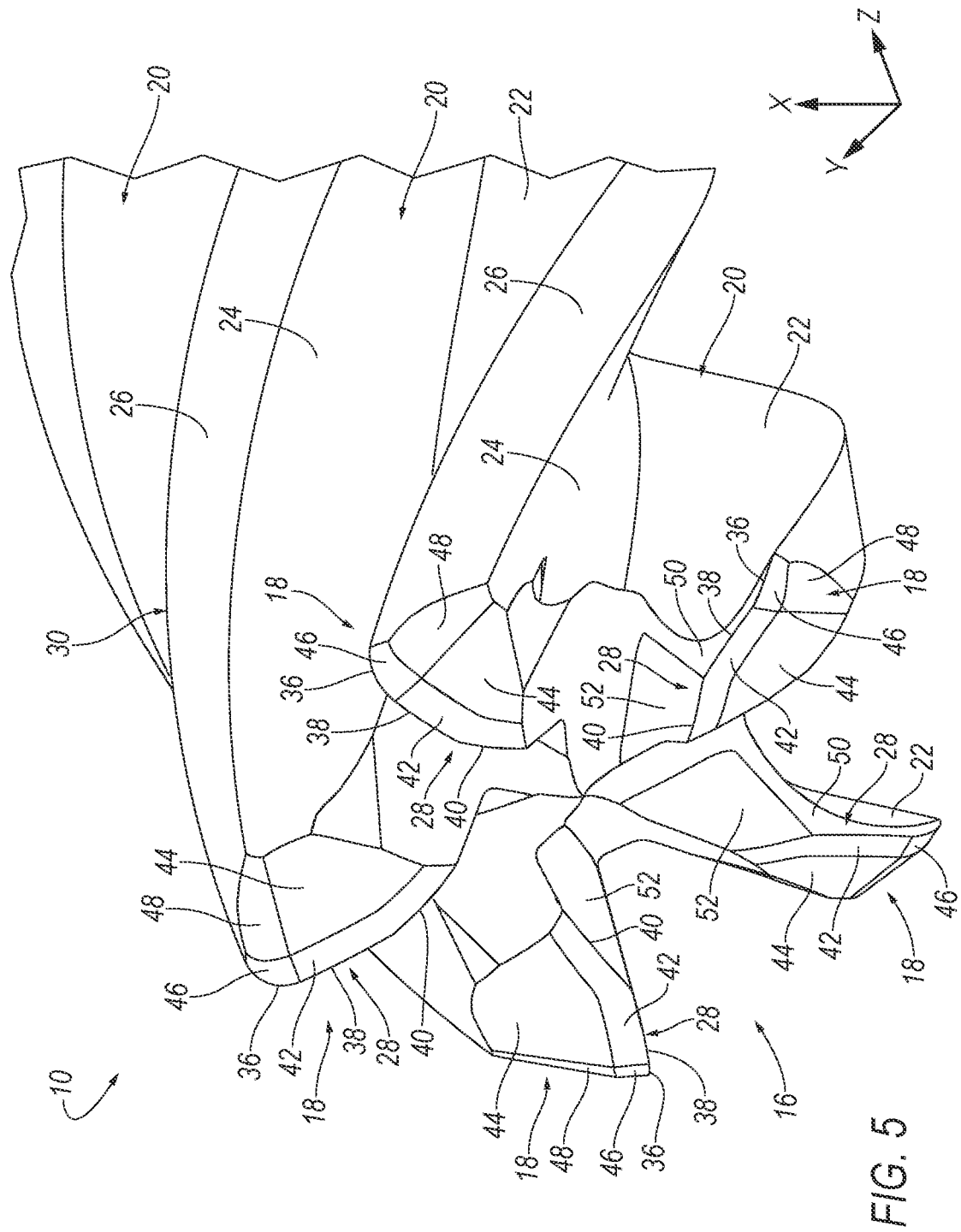
FIG. 5 is an enlarged isometric view of the cutting portion of the rotary cutting tool of FIG. 1.

As shown in FIG. 5, each end face cutting edge 28 has a primary clearance surface 42 adjoining both the first end face cutting edge portion 38 and the second end face cutting edge portion 40, and a second clearance surface 44 adjoining the primary clearance surface 42. As understood in the art, the primary and secondary clearance surfaces 42, 44 provide clearance for the end face cutting edge 28 during machining operations. Similarly, the corner cutting edge 36 has a corner primary relief surface 46 and a corner secondary relief surface 48 to provide clearance for the corner cutting edge 36. In addition, the first end face cutting edge portion 38 has a first curved rake face 50 and the second end face cutting edge portion 40 has a second curved rake face 52. In the illustrated embodiment, the first curved rake face 50 and the second curved rake face 52 have different axial and radial angles. As seen in FIG. 5, each flute 20 has a flute rake face 53 that adjoins the peripheral cutting edge 30 and the first curved rake face 50 for providing clearance for the peripheral cutting edge 30.

As shown in FIG. 3, one aspect of the invention is that the first end face cutting edge portion 38 defines a first radial angle 54, and the second end face cutting edge portion 40 defines a second radial angle 56 that is different than the first radial angle 54. For example, the first radial angle 54 can be between about +2 degrees and about −2 degrees with respect to a plane, $P_Y$-$P_Y$, that is substantially perpendicular to the central, longitudinal axis, A-A, (i.e., parallel to the y-axis), which has been found to be desirable for machining high temperature alloys, and the like.

By contrast, the second radial angle 56 of the second end face cutting edge portion 40 is highly positive, depending on the material to be machined. For example, the second radial angle 56 can be between about +11 degrees and about +15 degrees, which has been found to be desirable for machining high temperature alloys, and the like.

Figure 4:
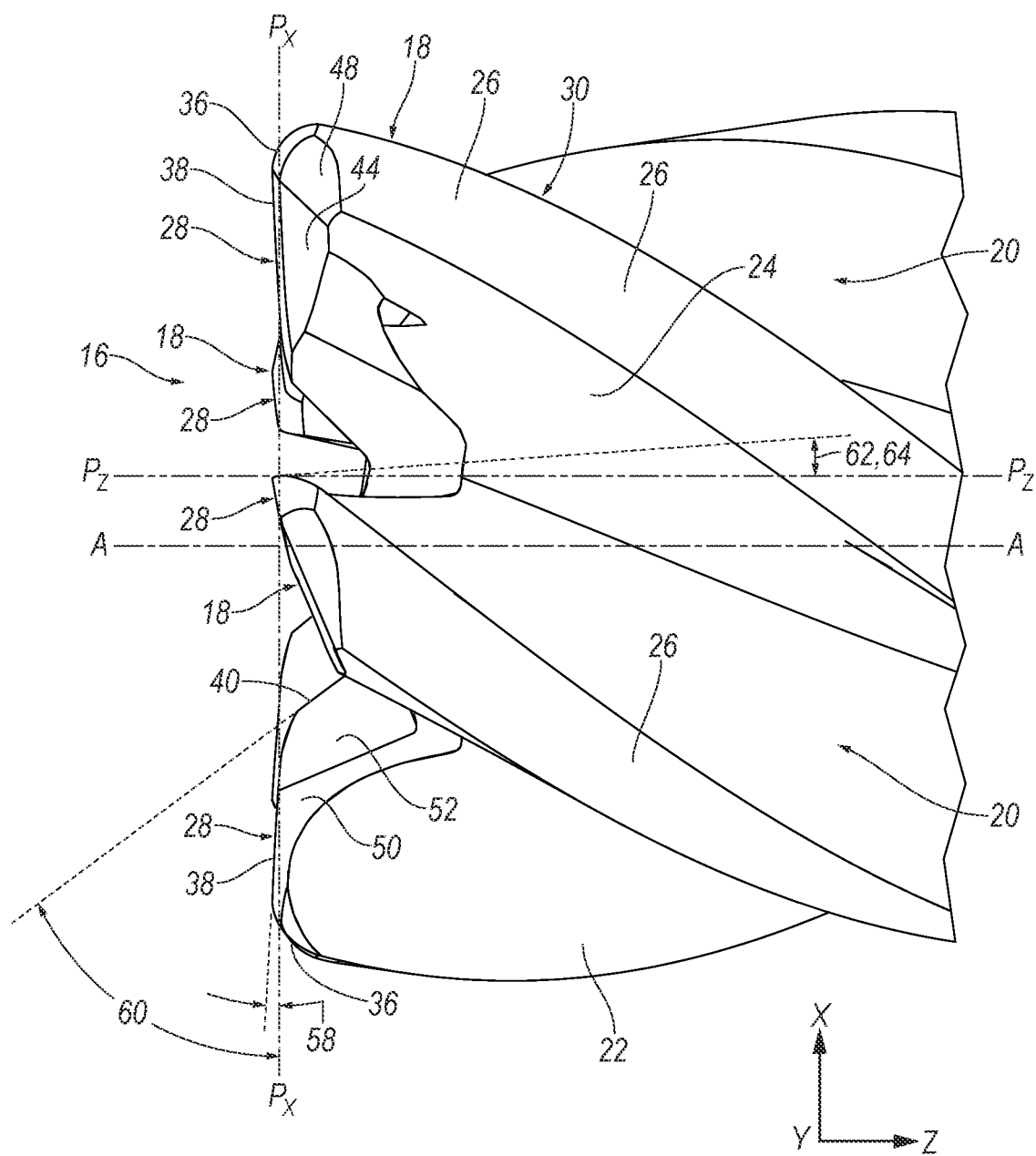
FIG. 4 is an enlarged, partial side view of the cutting portion of the rotary cutting tool of FIG. 1.

As shown in FIG. 4, the first end face cutting edge portion 38 defines a first dish angle 58 with respect to the plane, $P_X$-$P_X$, that is substantially perpendicular to the central, longitudinal axis, A-A, (i.e., parallel to the x-axis) and the second end face cutting edge portion 40 defines a second dish angle 60 with respect to the plane, $P_X$-$P_X$. More specifically, the first dish angle 58 is smaller in magnitude than the second dish angle 60. In other words, the second dish angle 60 is larger in magnitude than the first dish angle 58. In addition, the first dish angle 58 varies in a radial direction along the first end face cutting edge portion 38. Likewise, the second dish angle 60 varies in a radial direction along the second end face cutting edge portion 40. For example, the first dish angle 58 can vary in a range between about 0.5 degrees and about 8 degrees, and the second dish angle 60 can vary in a range between about 4 degrees and about 80 degrees. In one embodiment, for example, the first dish angle 58 can vary from about 1 degree to about 4 degrees, and the second dish angle 60 can vary from about 4 degrees to about 75 degrees. It will be appreciated that the invention can be practiced with other dish angles, so long as the first dish angle 58 is smaller in magnitude than the second dish angle 60.

The first end face cutting edge portion 38 defines a first axial rake angle 62 with respect to a plane, $P_Z$-$P_Z$, that is substantially parallel to the central, longitudinal axis, A-A, (i.e., parallel to the z-axis), depending on the material to be machined. In one embodiment, the first axial rake angle 58 is between about −1 degrees and about −15 degrees, which has been found to be desirable for machining high temperature alloys, and the like Similar to the first end face cutting edge portion 38, the second end face cutting edge portion 40 defines a negative second axial rake angle 64 with respect to the plane, $P_Z$-$P_Z$, depending on the material to be machined. For example, the second axial rake angle 64 can be between about −1 degrees and about −15 degrees for machining high temperature alloys, and the like.

Figure 6:
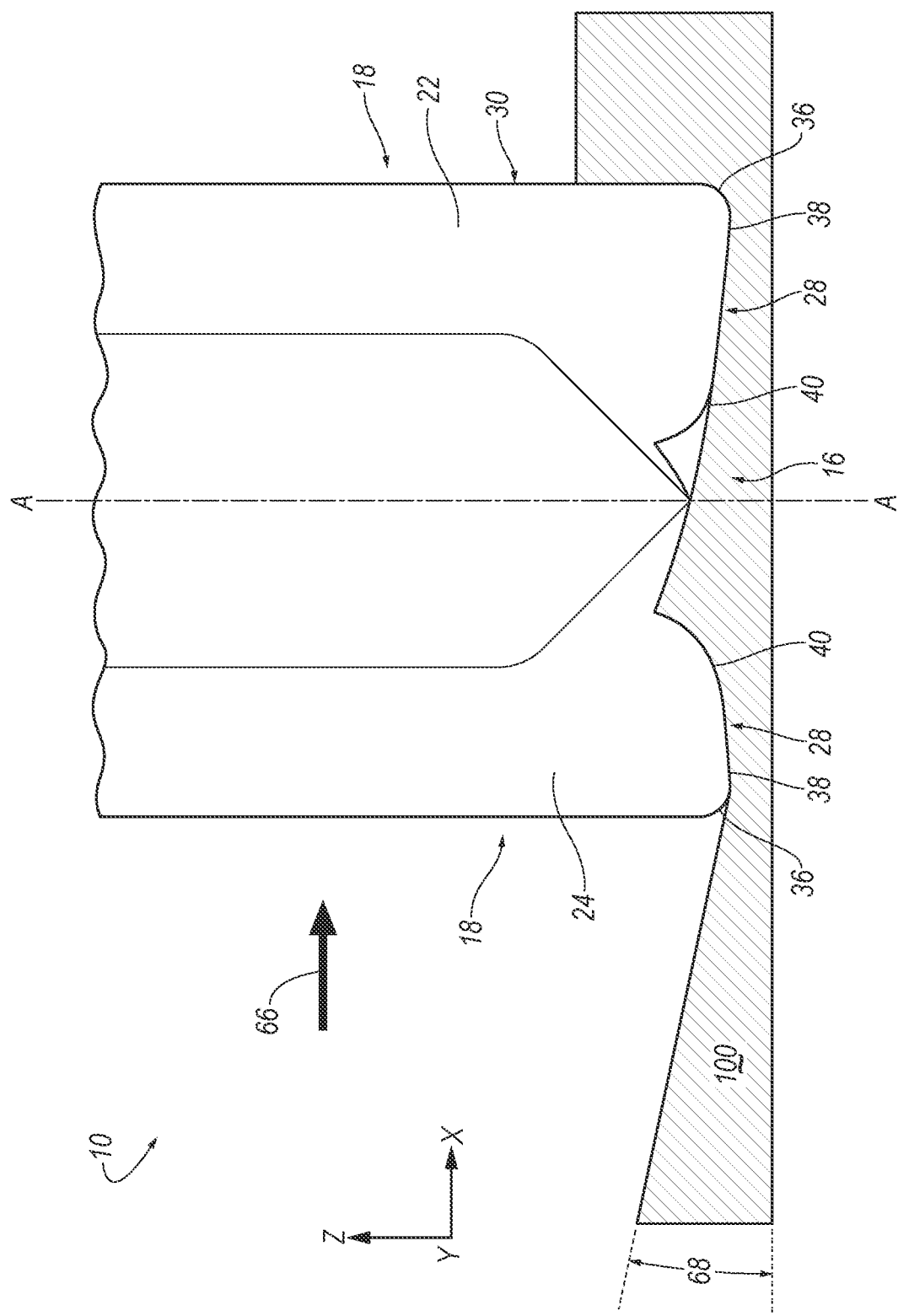
FIG. 6 is a schematic diagram of the rotary cutting tool of the invention during a ramp operation.

FIG. 6 shows a schematic diagram of the end mill 10 of the invention during a ramp operation (i.e., moving in the x-z plane) in the direction of the arrow 66 at a ramp angle 68 of greater than 15 degrees. In the illustrated embodiment, the ramp angle 68 is about 20 degrees. As shown in FIG. 6, the end mill 10 rotates in the clockwise direction and the leading face 22 is the right-hand side of the end mill 10, while the trailing face 24 is the left-hand side of the end mill 10. During the ramp operation, only the corner cutting edge 36 and the first cutting portion 38 of the cutting end 16 contact the work 100 at the leading face 22. It may appear that the second end face cutting edge portion 40 of the cutting end 16 may be slightly contacting the work 100 in FIG. 6. In reality, the second cutting portion 40 of the cutting end 16 on the right-hand side of end mill 10 does not contact the work 100.

On the other hand, both the first cutting portion 38 and the second cutting portion 40 of the cutting end 16 contact the work 100 when the trailing face 24 contacts the work 100. The corner cutting edge 36 may contact the work 100, but not the entire corner cutting edge 36, unlike the corner cutting edge 36 when the leading face 22 contacts the work 100.

As mentioned above, the first end face cutting edge portion 38 is designed for moderate ramp angles 68 of between about 3 degrees and about 5 degrees. In addition, the first end face cutting edge portion 68 can have a curved and complex profile, or a straight and complex profile, or any combination thereof. Further, the first end face cutting edge portion 38 can have either a positive first radial angle 54 or negative first radial angle 54, depending on the material to be machined. For example, the first radial angle 54 can be between about +2 degrees and about −2 degrees for machining high temperature alloys, and the like. Still further, the first end face cutting edge portion 38 can have a negative first axial rake angle 62, depending on the material to be machined. For example, the first axial rake angle 62 can be between about −1 degrees and about −15 degrees for machining high temperature alloys, and the like.

By contrast, the second end face cutting edge portion 40 is designed for large ramp angles 68 of between about 15 degrees and about 45 degrees. The second end face cutting edge portion 40 can have a curved and complex profile, or a straight and complex profile, or any combination thereof, but must follow an inward (i.e., center) pointing curved or radii profile. In addition, the second end face cutting edge portion 40 has a highly positive second radial angle 56, depending on the material to be machined. For example, the second radial angle 56 can be between about 11 degrees and about 15 degrees for machining high temperature alloys, and the like. Further, the second end face cutting edge portion 40 can have a negative second axial rake angle 64, depending on the material to be machined. For example, the second axial rake angle 64 can be between about −1 degrees and about −5 degrees for machining high temperature alloys, and the like.

As described above, the highly positive second radial angle 56 of the second end face cutting edge portion 40 of the cutting end 16 contacts the work 100 in such a way that the rotary cutting tool 10 is capable of performing a ramp operation with the ramp angle 68 of between about 15 degrees and about 45 degrees. As a result, the entire trailing face 24 of the end mill 10 aggressively cuts the work 100. In addition, the end mill 10 of the invention, which is a non-center cutting tool, is able to perform a plunge operation at an extremely high ramp angle, unlike conventional non-center cutting tools.

In addition to the above-described embodiments, it is to be understood that additional configurations may also be possible. For example, in some embodiments, any one or more of the axial profiles (first, second, third, fourth, and subsequent) may be curved or straight. Such embodiments can include embodiments in which all of the axial profiles in a cutting tool are curved, all axial profiles are straight, and/or some axial profiles are curved, and others are straight. In certain embodiments, all axial profiles are the same or substantially the same. In some other embodiments, all axial profiles differ from one another, generating a "variable helix" effect among the blades. Moreover, in some embodiments, some axial profiles may be the same or substantially the same as at least one other axial profile but may differ from one at least one other axial profile.

It is to be understood that although individual blades are described separately herein that any individual properties of particular blades may be applicable to one or more other blades on the rotary cutting tool. Alternatively, in some embodiments, no two blades in a rotary cutting tool may have the same dish and/or axial profiles. Additionally, it is to be understood that although embodiments are described herein have five or fewer blades, that any number of blades may be used consistent with the principles of the invention.

Having described presently preferred embodiments the disclosure may be otherwise embodied within the scope of the appended claims.

What is claimed is:

1. A rotary cutting tool, comprising:
   a shank portion; and
   a cutting portion adjoining the shank portion and having a cutting end, the cutting portion having a plurality of blades separated by flutes, each blade including a leading face, a trailing face, and a land surface extending between the leading face and the trailing face, each blade including an end cutting edge extending from an outer diameter of the cutting portion towards a central, longitudinal axis, A-A, of the rotary cutting tool, and a peripheral cutting edge at an intersection between the leading face and the land surface, the end cutting edge including a first end face cutting edge portion proximate an outer diameter of the rotary cutting tool, and a second end face cutting edge portion adjoining the first end face cutting edge portion and terminating before the central, longitudinal axis of the cutting tool to form a non-center cutting tool,
   wherein the first end face cutting edge portion defines a first axial rake angle between about −1 degrees and about −15 degrees with respect to a plane, $P_Z$-$P_Z$, that is substantially parallel to the central, longitudinal axis, A-A, of the rotary cutting tool and a first radial angle between about −2 degrees and about +2 degrees with respect to a plane, $P_Y$-$P_Y$, that is substantially perpendicular to the central, longitudinal axis, A-A, of the rotary cutting tool, and
   wherein the second end face cutting edge portion defines a second axial rake angle between about −1 degrees with respect to the plane, $P_Z$-$P_Z$, that is substantially parallel to the central, longitudinal axis, A-A, of the rotary cutting tool and about −15 degrees and a second radial angle between about 11 degrees and about 15 degrees with respect to the plane, $P_Y$-$P_Y$, that is substantially perpendicular to the central, longitudinal axis, A-A, of the rotary cutting tool, thereby enabling the rotary cutting tool to perform a ramp operation with a ramp angle of between about 15 degrees and about 45 degrees.

2. The rotary cutting tool according to claim 1, wherein first end face cutting edge portion is formed with a first dish angle with respect to a plane, $P_X$-$P_X$, that is substantially perpendicular to the central, longitudinal axis, A-A, of the rotary cutting tool, wherein the second end face cutting edge portion is formed with a second dish angle with respect to the plane, $P_X$-$P_X$, that is substantially perpendicular to the central, longitudinal axis, A-A, of the rotary cutting tool, and wherein the first dish angle is smaller in magnitude than the second dish angle.

3. The rotary cutting tool according to claim 2, wherein the first dish angle varies in a radial direction along the first end face cutting edge portion between about 0.5 degrees and about 8 degrees, and the second dish angle varies in the radial direction along the second end face cutting edge portion between about 4 degrees and about 80 degrees.

4. The rotary cutting tool according to claim 1, wherein the end cutting edge further comprises a corner cutting edge proximate an outer diameter of the rotary cutting tool.

5. The rotary cutting tool according to claim 1, wherein the rotary cutting tool comprises a solid end mill.

6. The rotary cutting tool according to claim 1, wherein each blade forms a helix angle between about 30 degrees and about 45 degrees.

7. The rotary cutting tool according to claim 1, wherein an angular spacing between the plurality of blades and the plurality of flutes is substantially unequal.

8. A rotary cutting tool, comprising:
   a shank portion; and
   a cutting portion adjoining the shank portion and having a cutting end, the cutting portion having a plurality of blades separated by flutes, each blade including a leading face, a trailing face, and a land surface extending between the leading face and the trailing face, each blade including an end cutting edge extending from an outer diameter of the cutting portion towards the central, longitudinal axis, and a peripheral cutting edge at an intersection between the leading face and the land surface, the end cutting edge including a first end face cutting edge portion proximate an outer diameter of the rotary cutting tool, and a second end face cutting edge portion adjoining the first end face cutting edge portion,
   wherein the first end face cutting edge portion defines a first axial rake angle between about −1 degrees and about −15 degrees with respect to a plane, $P_Z$-$P_Z$, that is substantially parallel to a central, longitudinal axis, A-A, of the rotary cutting tool, a first dish angle that varies in a radial direction between about 0.5 degrees and about 8 degrees with respect to a plane, $P_X$-$P_X$, that is substantially perpendicular to the central, longitudinal axis, A-A, of the rotary cutting tool, and a first radial angle of between about −2 degrees and about +2 degrees with respect to a plane, $P_Y$-$P_Y$, that is substantially perpendicular to the central, longitudinal axis, A-A, of the rotary cutting tool, and
   wherein the second end face cutting edge portion defines a second axial rake angle between about −1 degrees and about −15 degrees with respect to the plane, $P_Z$-$P_Z$, that is substantially parallel to a central, longitudinal axis, A-A, of the rotary cutting tool, a second dish angle that varies in the radial direction between about 4 degrees and about 80 degrees with respect to the plane, $P_X$-$P_X$, that is substantially perpendicular to the central, longitudinal axis, A-A, of the rotary cutting tool, and a second radial angle between about 11 degrees and about 15 degrees with respect to the plane, $P_Y$-$P_Y$, that is substantially perpendicular to the central, longitudinal axis, A-A, of the rotary cutting tool, thereby enabling the rotary cutting tool to perform a ramp operation with a ramp angle of between about 15 degrees and about 45 degrees.

9. The rotary cutting tool according to claim 8, wherein the end cutting edge further comprises a corner cutting edge proximate an outer diameter of the rotary cutting tool.

10. The rotary cutting tool according to claim 8, wherein the rotary cutting tool comprises a solid end mill.

11. The rotary cutting tool according to claim 8, wherein each blade forms a helix angle between about thirty degrees and about forty-five degrees with respect to the central axis.

12. The rotary cutting tool according to claim 8, wherein an angular spacing between the plurality of blades and the plurality of flutes is substantially unequal.

* * * * *